Dec. 12, 1939.　　　　K. M. HAMMELL　　　　2,182,894
TIME CONTROLLED SWITCH
Filed March 2, 1938　　　3 Sheets-Sheet 1
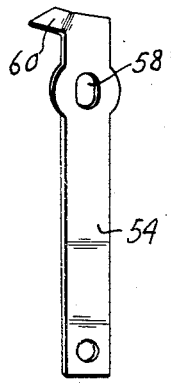
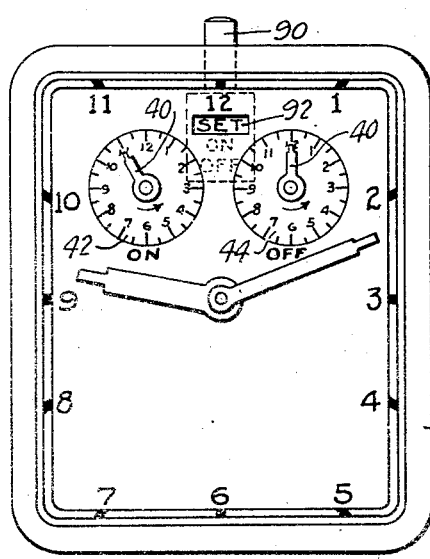
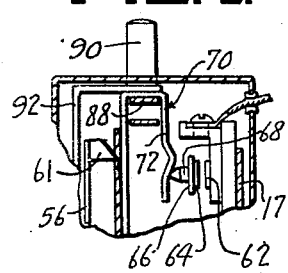
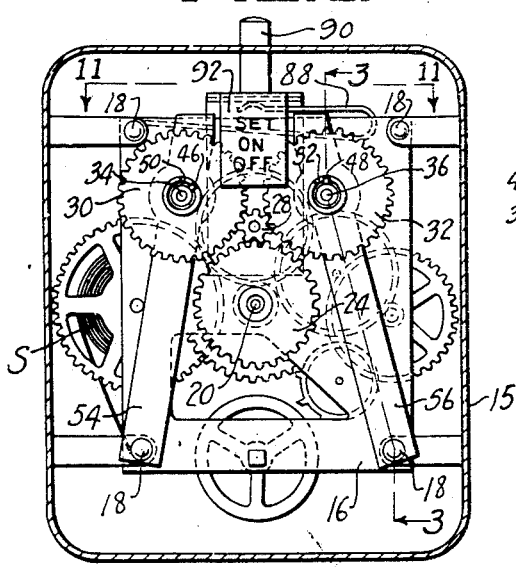
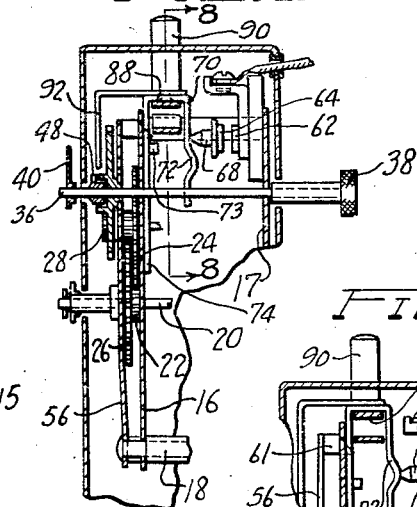
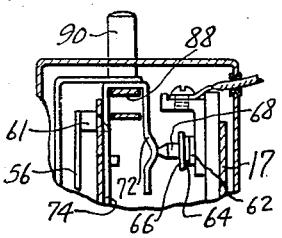
Inventor
Kemper M. Hammell
By Owen & Owen
Attorneys

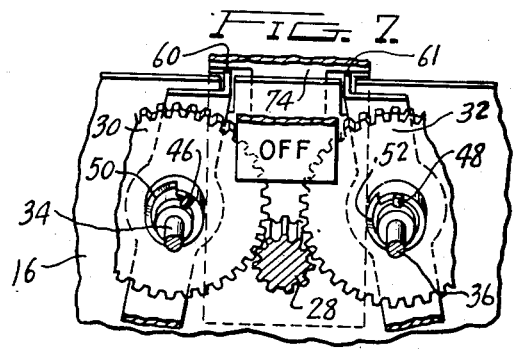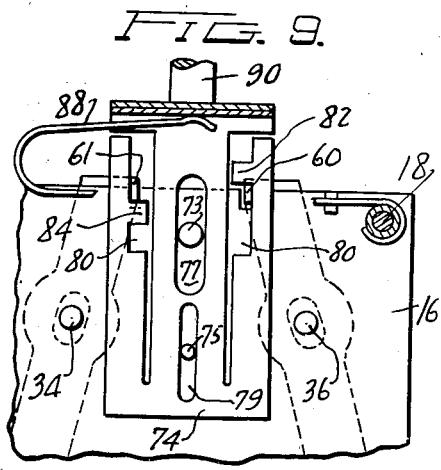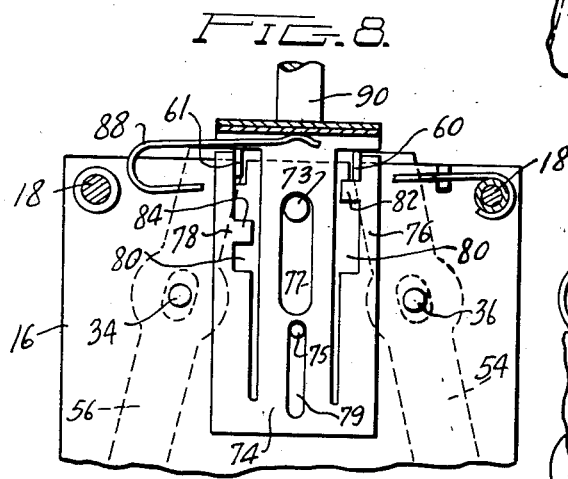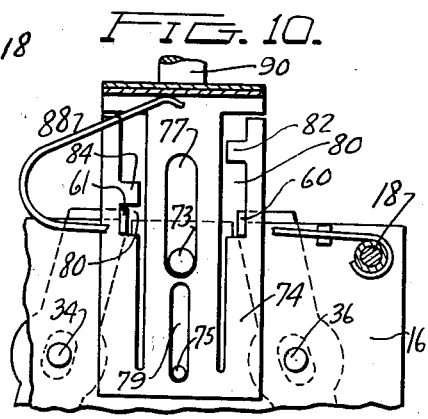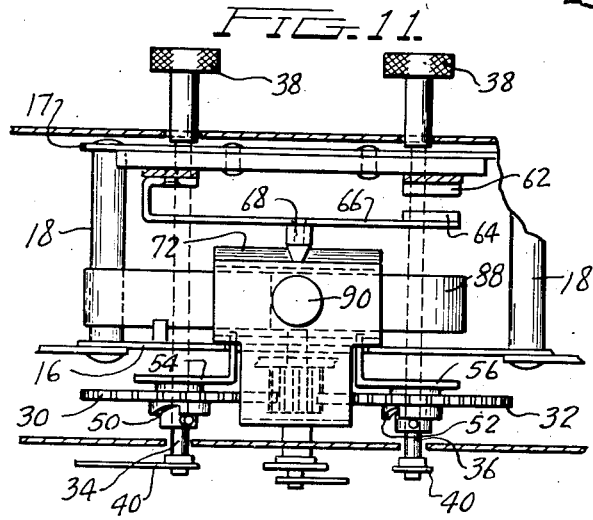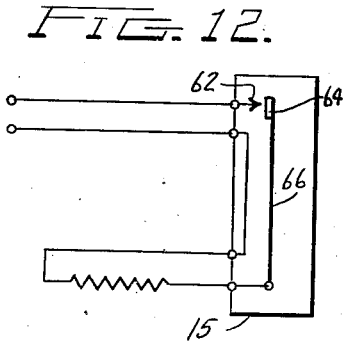
Inventor
Kemper M. Hammell

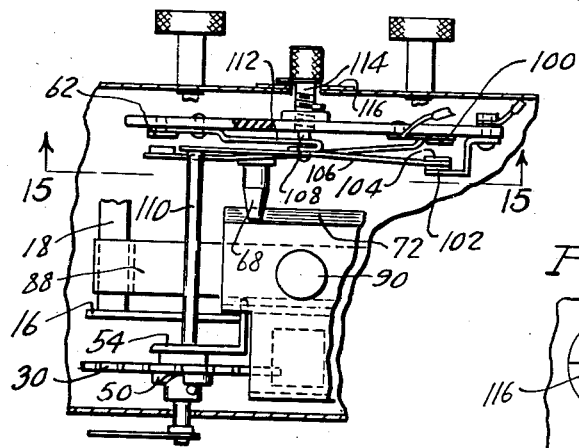
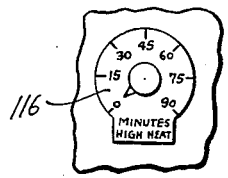
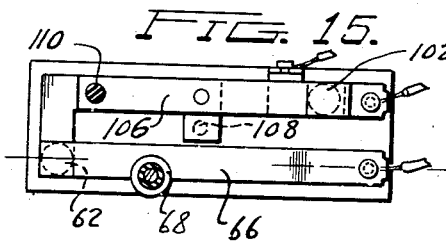
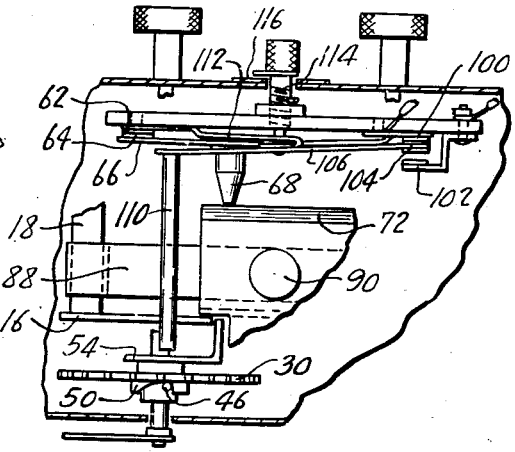
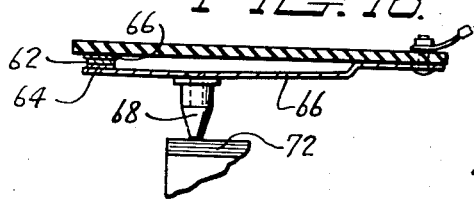
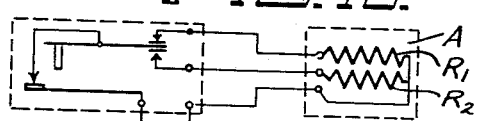
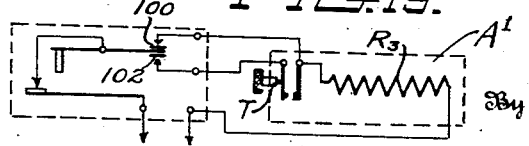
Inventor
Kemper M. Hammell Patented Dec. 12, 1939

2,182,894

UNITED STATES PATENT OFFICE 2,182,894

TIME CONTROLLED SWITCH

Kemper M. Hammell, Toledo, Ohio, assignor to The Swartzbaugh Manufacturing Company, Toledo, Ohio, a corporation of Ohio Application March 2, 1938, Serial No. 193,512

7 Claims. (Cl. 200—39)

This invention relates to a time controlled electric switch and is particularly directed to the mechanism employed to accomplish predetermined, timed closing and opening movements of a switch controlling an electric appliance.

The primary object of the invention is the provision of a mechanism to close and open a switch controlling an electric circuit which is simple and efficient in operation and which has few parts.

Another object of the invention is the provision of a simple mechanism to impart and control an interrupted rectilinear movement of a switch operator.

Another object of the invention is the provision of a simple and efficient means to enable an electrical appliance with which the timing device is associated to be "pre-heated" for a predetermined time.

Other objects and advantages of the invention will become apparent from the following detailed description, reference being had to the accompanying drawings, in which—

Fig. 1 is a front view of a timer constructed in accordance with the present invention; Fig. 2 is a front view of the timer with the face removed, the clock work drive being shown diagrammatically; Fig. 3 is a section taken on line 3—3 of Fig. 2 with the parts in "set" position; Figs. 4 and 5 are fragmentary views of the switch and switch operator showing the parts in "on" and "off" positions, respectively; Fig. 6 is a perspective view of an operator detent; Fig. 7 is an enlarged fragmentary perspective view showing a portion of the operator controlling mechanism; Figs. 8, 9 and 10 are enlarged fragmentary sections taken on the line 8—8 in Fig. 3 with the switch operator respectively in "set", "on", and "off" positions; Fig. 11 is an enlarged section on the line 11—11 in Fig. 2; Fig. 12 is a circuit diagram; Fig. 13 is a fragmentary sectional view of a modification which permits an electrical appliance to be placed on a "high" heat for a predetermined length of time after which it is automatically changed to "low" heat; Fig. 14 is an elevation of the indicator for the "high" and "low" heat switch; Fig. 15 is a section on line 15—15 of Fig. 13; Fig. 16 is a section on line 16—16 of Fig. 15; Fig. 17 is a view of the parts shown in Fig. 13 standing in another position, and Figs. 18 and 19 are circuit diagrams showing "pre-heating" arrangements.

Referring to the drawings, and particularly to Figs. 1 and 2 thereof, the timer is shown mounted in a clock casing 15, on a frame including a front plate 16 and a rear frame plate 17 spaced apart by posts 18 at the four corners of the frame. The frame carries any suitable chronometric power source such as a clock works for use in driving the mechanism. The minute hand driven shaft of the clock works is designated 20 and carries the usual pinion 22 which drives an hour gear 24 through an intermediate idler gear 26 and an elongated pinion 28.

The present invention is particularly concerned with a device having a setting mechanism including similar "on" and "off" units driven by the clock mechanism which are manually set to operate at predetermined times. Pinion 28, besides meshing with hour gear 24 of the clock mechanism, meshes with two similar gears of the same size as the hour gear and designated 30 and 32 so that these latter are rotated at the same speed as the hour gear and hand of the clock. The gears 30 and 32 are carried by parallel shafts 34 and 36 respectively which extend through the clock casing and terminate at the rear in setting knobs 38. The gears are free to rotate and to slide on their respective shafts, and the pinion 28 is so constructed that each gear may slide for a considerable distance on its shaft and remain in mesh with the pinion.

The shafts 34 and 36 each carry indicating hands 40 on their front ends which cooperate with dials 42 and 44 on the face of the clock to impart certain information as hereinafter set forth. Intermediate its ends, each shaft 34 and 36 carries a cam follower including projecting a pin 46 and 48, respectively. The gears 30 and 32 are provided with projecting cam surfaces 50 and 52 adjacent their hub portions and cooperating with the cam following pins 46, 48, respectively. Instead of being completely annular, the cam surfaces 50 and 52 are cut away to provide sharp shoulders as shown in Fig. 7 so that when the followers reach a predetermined point in their rotation, a relative axial movement between the respective followers and gears will be permitted.

The timer gears 30 and 32 are urged axially of the shafts 34 and 36 on which they are mounted by elongated leaf springs 54 and 56 which are fulcrumed on the front frame plate 16 adjacent the lower end thereof, preferably at the posts 18 which serve to fix the front frame plate in place. A detail of one of the leaf springs is shown in Fig. 6 and it will be seen that each spring is provided with a hole 58 through which the shafts 34 and 36 may pass and, in addition, is provided at its extreme upper end with a rearwardly extending detent 60, or 61.

Referring to Figs. 3, 4 and 5, it will be seen that the present invention is particularly concerned with the operation of a switch including a stationary contact point 62 and a movable contact point 64, the latter being carried at the end of a spring arm 66 fastened at one end. A button of insulating material 68 is carried by the arm 66 and is urged thereby into the path of a reciprocable switch operator which is preferably formed as a U-shaped yoke 70, one arm of which constitutes a switch operating cam 72. It will be seen from Figs. 3, 4 and 5 that in one position of its rectilinear movement the arm 72 will cam the switch points to closed position.

The opposite arm of the yoke 70 is disposed immediately behind the front frame plate 16 in a plane parallel to the plane of the yoke. The front arm of the yoke is best shown in Figs. 8, 9 and 10 and includes a body of sheet metal 74 preferably of a resilient nature from which side latch members 76 and 78 are formed by severance from the body 74. Each latch member is provided with a relatively wide slot 80 and the latch member 76 is formed with an inwardly projecting lug 82 spaced a predetermined distance from its upper end and the latch member 78 is provided with an inwardly projecting lug 84 spaced a greater distance from its upper end than the distance which separates the lug 82 from the end of latch member 76. The front frame plate 16 is slotted to permit the entrance of detents 60 and 61 of the two leaf springs 54 and 56 so that, as shown in Fig. 3, the extreme inner ends of the detents may be forced into the slots 80 in the path of the two lugs 82 and 84. Pins 73 and 75 are fixed to the front frame part and serve to guide the yoke 70 in its rectilinear movement by engaging in slots 77 and 79 in the front leg of the yoke. These pins may also be used to determine the extent of movement which may be imparted to the yoke.

The yoke 70 is biased to move upwardly by a suitable leaf spring 88 which is pivoted at one end to one of the frame posts 18 and which has its free end engaging the right portion of the yoke. When the leaf springs 54 and 56 are compressed and forced rearwardly into the slots 80, if the yoke is moved downwardly the detent 60 of the spring 54 will engage the upper surface of lug 82 and thus retain the yoke in its lowered position. If at the same time, the detent 61 of the leaf spring 56 is moved into the opposite slot, release of the yoke from engagement between the lug 82 and the first detent will permit the spring 88 to move the yoke only until lug 84 strikes the detent 61 of spring 56. It is only when spring 56 is permitted to move out of the compressed position that the yoke can move upwardly to the limit of its movement.

The yoke 70 may be operated from the exterior of the casing by means of a suitable push button 90 by which the user can force the yoke down against the tension of leaf spring 88. An indicating flag 92 bearing the indicia "set", "on", and "off" extends forwardly and downwardly with respect to the yoke 70 and cooperates with a window in the clock face to indicate the position in which the yoke is standing, and hence the condition of the switch contacts 62 and 64.

In operation, the timer will be associated with a suitable clock works driven by any desired mechanical or electrical power source such as spring S (Fig. 2). The user sets the "on" indicator by turning knob 38 until the hand 40 associated with the "on" dial reaches the point at which it is desired to have the appliance turned on, and in a similar manner, sets the hand associated with the "off" dial to indicate the time at which the appliance shall be turned off. As shown in Fig. 1 of the drawings, if at 9:12 a. m. the user wishes to turn the appliance on at 11:00 a. m., and off at 12:00 m., the hands will be moved to the positions shown. This movement of the shafts 34 and 36 has moved the projecting pins 46 and 48 of the cam followers on to the lands of the associated cams 50 and 52 so that the timing gears 30 and 32 are moved rearwardly against their associated leaf springs 54 and 56, forcing the detents of the latter into the slots of the front leg of the yoke 70.

The user next pushes down on push button 90 so as to place the timer parts in "set" position shown in Figs. 3 and 8. In moving the yoke 70 downwardly the lug parts of the front leg 74 of the yoke moves past the detents 60 and 61 and in so doing the leaf spring side portions 76 and 78 deflect inwardly so that the downward movement of the yoke may be accomplished easily. When the yoke and push button have reached the lower limit of their movement, as determined by pin 73, the two detents will have entered the slots 80 and detent 60 will engage the upper surface of lug 82 so as to retain the yoke in its lowered, "set" position.

The clock movement will then rotate gears 30 and 32 until the cam surface 50 moves to such an extent that its shoulder portion moves under the associated pin 56 so that the gear 30 is free to move forwardly on the shaft 34 under the pressure of the leaf spring 54 which moves outwardly and disengages its detent 60 from the shoulder 82 of the yoke. The yoke then springs upwardly as shown in Fig. 9, under the influence of spring 88 until the detent 61 interrupts the rectilinear movement by engaging the upper surface of stop lug 84. As previously explained the switch points 62 and 64 are now in "closed" position, having been cammed to this position by the rear leg of the yoke 70 (Fig. 4).

The parts will remain in the "on" position until the timing gear 32 has been driven to such an extent that the sharp shoulder of its associated cam surface 52 rides under the follower pin 48 and permits the pin to enter the reentrant portion of the cam so that the gear may move forwardly on the shaft. As the gear 32 moves forwardly under the influence of its associated leaf spring 56, the detent 61 of the latter moves away from the upper surface of the lug 84 and thus permits the yoke 70 to spring upwardly to the "off" position shown in Fig. 10. It will be appreciated that since the gears 30 and 32 move at the same rate as the hour hand of the clock, that the interim between the "on" and "off" movements above described will be one hour as indicated by the hands 40 which are fixed on their respective shafts in definite relation.

While the cam 52 has been moving with relation to follower pin 48 to permit the switch parts to move to the "off" position, the cam 50 associated with the "on" gear 30 has been moving so that the follower pin 46 will move out of the reentrant portion of the cam and thus force the gear 30 and its leaf spring 54 rearwardly so that the detent 60 moves into the slot 80 beneath the lug 82 and in position to engage the bottom of the slot when the yoke springs to "off" position and in this way accomplishes a limiting movement of the yoke. However, in the event that the "on" and "off" movements are timed too closely to allow the detent 60 to move back into its slot 80, the pin 73 will serve to limit the upward movement of the yoke after the final movement of the yoke has taken place.

If the timer is associated with an electrical appliance such as a roaster or an oven, it may be desirable to provide means to change a circuit connection after a predetermined time as, for example, to increase the current input to the appliance during the first few minutes of operation over the current desired for continued operation. Thus in the case of a roaster, it may be desirable to operate the same on the "high" heat position for perhaps 30 minutes and then reduce the current to the "low" heat. In this manner the heat absorption of the roaster parts may be rapidly accounted for and the contents thereof brought rapidly to cooking temperature. Once this temperature is attained, a relatively small current is required to maintain it. The present invention provides a simple and efficient mechanism to accomplish this end which includes, as shown in Fig. 13, oppositely disposed stationary contacts 100 and 102 respectively, which may be connected to the "high" and "low" resistors of the appliance, respectively, or in any other suitable manner to provide the necessary heat gradations. A circuit diagram of these parts is shown in Fig. 18 in which the appliance is designated generally A and includes a high heat resistor R1 and a low heat resistor R2 connected respectively to "high" and "low" contacts 100 and 102.

An alternate arrangement is shown in Fig. 19 in which the appliance $A^1$ is provided with a thermostatic control T. In this event, the "high" contact 100 is connected directly to the resistance R3 of the appliance so as to shunt out the thermostat during the pre-heating period. The "low" contact 102 is connected to the thermostat T for normal operation.

A cooperating movable contact 104 is disposed between the stationary contacts and mounted on the end of a lever 106 which is pivoted intermediate its ends to a carrier 108. At its opposite end the lever 106 is connected to an operating rod 110 which projects through the front frame part 16 into the path of the leaf spring 54 of the "on" setting mechanism. In this construction main switch arm 66 has been reversed over the position shown for example in Fig. 11 so as to be hinged at the opposite end. When the cam 50 and its associated follower have forced the leaf spring 54 rearwardly, the leaf spring acts to impart movement to the lever 106 and to close the movable switch contact 104 against the "low" stationary contact 102. However, since the main switch is open at this time, no current will flow to the appliance. When the cam 50 rotates its recessed portion rides under the follower pin 46 permitting the leaf spring and timer gear to move forwardly to the position shown in Fig. 17. As above described, the main switch points are then closed and at the same time the lever 106 pivots about its center to place the movable contact 104 in direct connection with the stationary "high" contact 100. This movement may be caused by reason of a reversely bent leaf spring 112 which has one end fixed and its opposite end engaged with the lever 106 at its fulcrum.

Continued rotation of the cam 50 relative to the follower pin 46 will move the gear and leaf spring rearwardly as the inclined surface of the cam moves under the follower. This relatively slow rearward movement of the spring is imparted to the rod 110 and turns to the switch lever 106 to move the contact 104 from the "high" to "low" position. The transition will, of course, mean that for the length of time necessary to move the switch point 104 between the oppositely disposed stationary contacts, the appliance will be receiving no heat as the circuit is interrupted. However, this may be adjusted by varying the distance between the contacts and may be cut to a very few minutes if desired.

In order to regulate the length of time that the contacts will remain closed on the "high" side, a means to vary the position of the fulcrum of lever 106 is provided and may include a screw 114 threaded into a stationary frame part and bearing against a portion of the lever at its inner end. The tendency of the lever being to move rearwardly in Fig. 13, it will follow closely the inner end of screw 114. Thus the position of the actuating rod 110 carried on the end of the lever may be adjusted by turning the screw 114 in or out. As shown in Fig. 17, when the cam 50 has just moved its recessed area under the follower pin 46, a slight clearance exists between the end of the actuating rod 110 and the leaf spring 54 which must be taken up before the leaf spring will move the switch parts from the "high" position. Effectively, the screw 114 merely determines this clearance.

The lever 106 and its switch point 104 are placed in circuit by reason of the spring 112 being connected with the stationary contact 62 of the main switch.

A dial 116 (Fig. 14) may be placed on the rear of the timer casing to cooperate with a pointer carried by screw 114 to indicate the length of time the switch points will remain on the "high" contact before being moved.

Having thus described my invention, what I claim as new, and desire to secure by United States Letters Patent, is:

1. An apparatus adapted to control a multi-circuit electric appliance including a main switch and a double-throw switch in series with said main switch, a clock mechanism, a setting mechanism including a setting unit driven by said clock mechanism and having a normally released spring, a detent carried by said spring, an actuating rod for said double-throw switch disposed to be operated by said spring, a control manually operable to stress the spring and place the detent in engaged position and permit release thereof at a predetermined time, said double-throw switch standing in one position when the detent of said spring is engaged and in another position when the detent of said spring is released, and an operator for said main switch movable to a predetermined position in which it is held by said detent until released, and said setting mechanism having a clock driven part adapted to move said double-throw switch from the position in which it stands when said detent is released to the position in which it stands when said detent is engaged after a predetermined period of time.

2. An apparatus adapted to control a multi-circuit electric appliance including a main switch and a double-throw switch in series with said main switch, a clock mechanism, a setting mechanism including a setting unit driven by said clock mechanism, means to operate said main switch from said setting unit at a predetermined time, an actuating rod for said double-throw switch disposed to be operated by said setting unit, said double-throw switch including a pivoted switch arm connected to said rod, and means to vary the position of the pivot point of said switch arm whereby the operating period of said double-throw switch is adjusted.

3. An apparatus adapted to control a multi-heat electric appliance including a main switch and a double-throw switch in series with said main switch, a clock mechanism, a setting mechanism, means to operate said main switch from said setting mechanism, and means to operate said double-throw switch from said setting mechanism.

4. An apparatus adapted to control a multi-heat electric appliance including a main switch and a double-throw switch in series with said main switch, a clock mechanism, a setting mechanism including a cam means driven by said clock mechanism and having a reentrant portion and an inclined portion immediately thereafter in the direction of rotation, means to operate said main switch from said setting mechanism, and means to operate said double-throw switch from said setting mechanism whereby, when the reentrant portion of said cam means is operating said double-throw switch stands in one position and is moved to stand in its other position by said inclined portion of said cam means upon continued movement of said clock mechanism.

5. In an apparatus of the class described, a switch for an electric circuit to be controlled, a reciprocable cam operator for said switch, latch means associated with said cam operator including a plurality of spaced latch lugs, means urging said cam and said latch means to a released position, normally disengaged detent mechanisms to hold said cam and said latch means in a plurality of engaged positions by engagement with said lugs, setting means to move each of said detent mechanisms into engaging positions, and clock driven means to move a portion of said setting means to release each of said detent mechanisms in predetermined sequence.

6. In an apparatus of the class described, a switch for an electric circuit to be controlled, a reciprocable cam operator for said switch, a latch plate connected to said cam operator and reciprocable therewith, said latch plate having a plurality of laterally extending latch lugs, means urging said cam and plate to a released position, normally disengaged detent mechanisms to hold said cam and plate in a plurality of engaged positions by engagement with said lugs, setting means to move each of said detent mechanisms into engaging position, and clock driven means to move a portion of said setting means to release each of said detent mechanisms in predetermined sequence.

7. In an apparatus of the class described, a switch for an electric circuit to be controlled, a reciprocable cam operator for said switch, a substantially U-shaped yoke, one arm of which is provided with a raised cam to operate said switch and the other arm of which constitutes a latch plate, latch lugs formed from said latch plate, means to bias said yoke to a released position, normally disengaged detent mechanisms to hold said yoke in a plurality of predetermined positions against the force of said biasing means by engagement with said lugs, setting means to move each of said detent mechanisms into engaging position, and clock driven means to move a portion of said setting means to release each of said detent mechanisms in predetermined sequence.

KEMPER M. HAMMELL.